May 9, 1972  G. PREGAGLIA ET AL  3,661,932
PROCESS FOR THE PREPARATION OF 1,3,5-TRIOXANE
Filed May 1, 1967  2 Sheets-Sheet 1

INVENTOR.
GIANFRANCO PREGAGLIA
MARCO AGAMENNONE
BY LUIGI CAVALLI

3,661,932
PROCESS FOR THE PREPARATION OF 1,3,5-TRIOXANE

Gianfranco Pregaglia, Milan, and Marco Agamennone and Luigi Cavalli, Novara, Italy, assignors to Montecatini Edison S.p.A., Milan, Italy
Filed May 1, 1967, Ser. No. 635,250
Claims priority, application Italy, May 5, 1966, 10,175/66
Int. Cl. C07d 19/00
U.S. Cl. 260—340                     4 Claims

ABSTRACT OF THE DISCLOSURE

Increasing the productivity of the reaction in the preparation of 1,3,5-trioxane from a concentrated formaldehyde solution containing a strong acid by including in the solution from about 5 to 15 grams per 100 cc. of solution of a soluble acid salt of aluminum or of a monovalent or a bivalent metal selected from the group I-A, II-A and II-B metals, Mn, Fe, Co and Ni, the salt being of an acid having a pKa lower than 2.

BACKGROUND OF THE INVENTION

(1) Field of the invention

The present invention relates to a process for the preparation of trioxane, the cyclic trimer of formaldehyde, which is used as a source of anhydrous formaldehyde and as an intermediate for the production of acetal resins. The acetal resins may be used, for example, to produce synthetic textile fibers. Furthermore, trioxane can be used as solid fuel. Trioxane is a crystalline white solid, which melts at 63–64° C. and boils at 113–114° C. It gives an azeotrope with $H_2O$ at 91° C., consisting of 70% by weight of trioxane and 30% by weight of $H_2O$. It is soluble in $H_2O$ at room temperature up to 20% by weight; it is readily soluble in methylene chloride, chloroform, acetone, benzene and many other chlorinated solvents.

(2) Description of the prior art

As is known, trioxane can be prepared from 30–70% by weight aqueous formaldehyde solutions, containing a strong acid, by heating at a temperature of about 100° C. The trioxane is generally separated from the reaction medium by azeotropic distillation. A distillate is thus obtained, wherein trioxane, water and formaldehyde are present in varying amounts. It is also known that trioxane can be obtained from organic solutions of paraformaldehyde containing an acid catalyst or from formaldehyde in the vapor phase in the presence of catalytic amounts of copper, zinc, or manganese.

All the above mentioned processes, however, have a low productivity (10–15 g./h./l. of reacting solution), thus requiring difficult distillation conditions (high reflux ratios) and expensive apparatus. It is possible to increase the conversion rate by increasing the reaction temperature (for instance by increasing the operating pressure) or by working in the presence of high concentrations of $H_2SO_4$ (above 8%). These conditions, however, cause marked decreases in yield because of side reactions (dismutation and polymerization of formaldehyde to linear products).

It has also been suggested to use reaction mixtures consisting of paraffin oils and of a 60–80% by weight formaldehyde solution, in the presence of $C_{14}$–$C_{16}$ alkanesulfonic acids which act as catalysts and emulsifiers. However, in this case also, the productivity is not higher than 30 g./h./l. of reacting solution.

SUMMARY OF THE INVENTION

We have now surprisingly found that it is possible to markedly increase the productivity, without lowering the yield, by adding relatively high amounts of some soluble salts to the reaction medium. In consequence of this high specific production it is possible to distill the trioxane with a low reflux ratio, thus employing less demanding working conditions. The addition of these salts to the reacting system accelerates the rate of formation of the trioxane at a given temperature, analogously to what is observed when the concentration of mineral acid is increased. That is, the higher productivity of the resulting system does not depend upon an increase in temperature, but rather on an increased activity of the catalytic system. On the other hand, contrary to what is observed with high concentrations of acid, the presence of the salts does not reduce the yield of the process because they do not promote interfering side reactions of formaldehyde.

Accordingly, the improvement provided by the present invention is the addition to the reaction medium of an organic or inorganic soluble salt of aluminum or of a monovalent or bivalent metal selected from the group consisting of the metals of groups I-A (Li, Na, K, Rb), II-A (Mg, Ca, Sr, Ba), II-B (Zn, Cd, Hg) and Mn, Fe, Co and Ni. More particularly, the soluble salts of the present invention are salts of inorganic or organic acids having a pKa<2.

Figure 1:
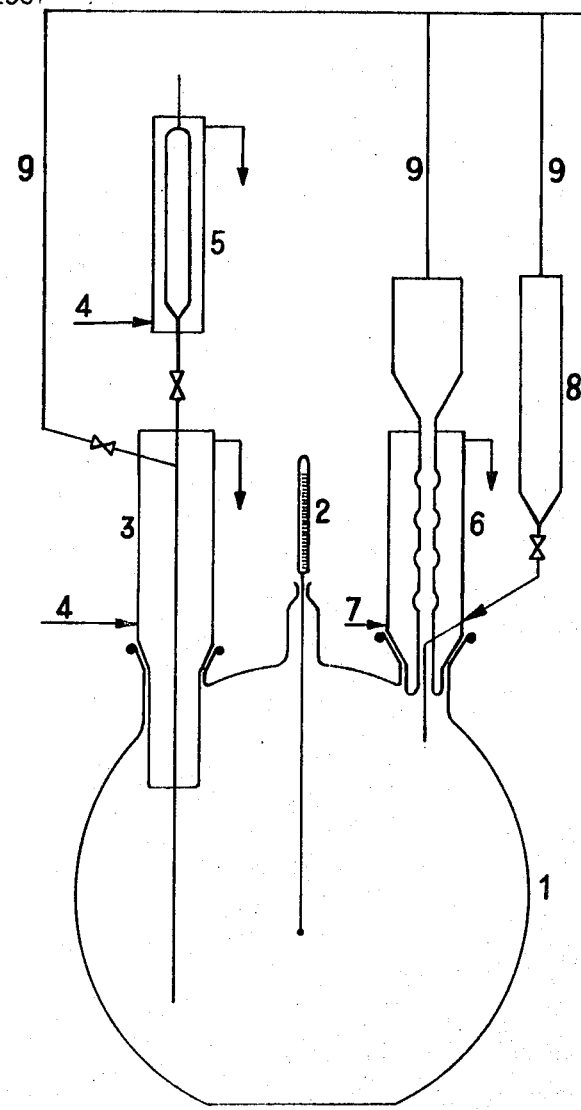
FIG. 1 is a schematic view of one form of apparatus which may be employed in carrying out the process of the present invention.

Referring now to the drawings in detail, and with particular reference to FIG. 1, the illustrated apparatus comprises a spherical 2-liter reactor 1, provided with a thermometer 2, a sampling device comprising a tube 3 communicating with a pipette 5, a reflux condenser 6 and a catalyst feeder 8. Conduits 4 supply hot water for heating tube 3 and pipette 5, and a conduit 7 supplies cold water for cooling the condenser 6. Conduit system 9 provides a nitrogen head, desirably at a pressure of about 5 cm. Hg at tube 3, condenser 6 and feeder 8, to thereby maintain a constant pressure on the system and facilitate the drawing of samples.

Figure 2:
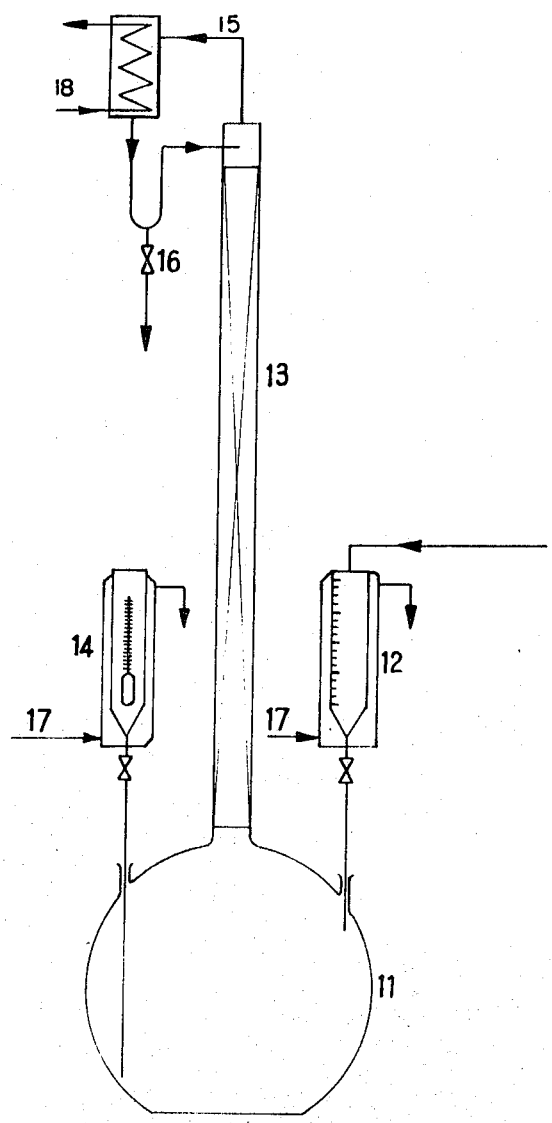
FIG. 2 is a schematic view of another apparatus which is particularly suitable for carrying out the process of the present invention in a continuous manner.

Referring now to FIG. 2, the illustrated appartus for continuous production of trioxane comprises a 2-liter glass reactor 11 provided with a concentrated formaldehyde solution feeder 12, a continuous density determining device 14, and a rectification column 13. Device 14 for the determination of density is a glass tube provided with jacket and kept at constant temperature wherein a portion of the reacting solution is sucked by means of vacuum; the density of said solution is determining by means of the densimeter. Cooling means 15, provided with a valve 16 for automatically regulating the reflux rate, is connected with the column 13. Cooling means 15 consists of a washing tower wherein the condensed vapors act as washing liquid to fix the gaseous formaldehyde. The valve 16 is a device for removing the distillate and furthermore it allows to maintain the reflux constant. Conduits 17 provide warm water for heating the density device 14 and the feeder 12. Cold water is supplied to cooling means 15 through line 18.

DESCRIPTION OF THE PREFERRED EMBODIMENTS

Suitable salts for use in the present invention include chlorides, sulfates, methionates (methanedisulfonic acid), benzenesulfonates, p-toluene-sulfonates, trichloroacetates etc. of metals of groups I-A (Li, Na, K, Rb), II-A (Mg, Ca, Sr, Ba), II-B (Zn, Cd, Hg) and Mn, Fe, Co and Ni. On the other hand, salts such as KF or $CH_3COONa$, which although very soluble, derive from weak acids, and are inactive.

The salts used in the present invention must be soluble (at least about 5 g./100 cc.) in the concentrated formaldehyde solution (50–70 g./100 cc.) and must not cause undesirable side reactions, such as, for example, the precipitation of linear polymers of formaldehyde, the formation of an insoluble salt by reaction with the acid catalyst or the dismutation of formaldehyde.

Concentrations of salts from about 5 to 15 g. per 1000 cc. of solution are used. Generally, the desired effect is more evident with increasing salt concentration. However, certain limits should not be exceeded, which limits vary according to the nature of the salt used and the concentration of the formaldehyde. Beyond such limits, there is a tendency for a linear polymer to precipitate. For instance, lithium chloride is soluble at 100° C. up to 15 g. in 100 cc. of a solution containing 60 g. of $CH_2O$ and 2 g. of $H_2SO_4$. However, the system is unstable and in a short time granudally increasing precipitations of polyoxymethylenes occur. By reducing the concentration of the lithium chloride to 10 g./100 cc., this disadvantage is avoided and the high increase in the rate of formation of trioxane is maintained. Using the sodium salt of p-toluene-sulfonic acid, stable solutions are obtained also with systems containing 15 g. of the salt, 60 g. of formaldehyde and 2 g. of sulfuric acid per 100 cc. solution.

As catalysts, strong acids (e.g., sulfuric, hydrochloric, benzenesulfonic, toluenesulfonic, methionic, etc.) are used, in amounts which give a concentration of hydrogen ions corresponding to that given by the presence of from 0.1 to 8% by wegiht of sulfuric acid. Cation exchange resins, such as the sulfonic resins Kastel C 300 of Montecatini, Amberlite IR 120 of Rohm & Haas, etc. can also be used. (The amount of said resin is such as will give a hydrogen ion concentration corresponding to 0.1–8% of sulfuric acid.) Sulfuric acid in concentrations of from about 2 to 6 g./100 cc. or paratoluenesulfonic acid in concentrations of from about 5 to 15 g./100 cc. are preferably used.

The process is carried out at temperatures between about 95 and 105° C. The pressure can be slightly higher or slightly lower than atmospheric; for convenience, it is preferable to work at approximately atmosphere pressure, under reflux. The restoration of formaldehyde to the reaction mixture is effected with concentrated (50–90% by weight) formaldehyde solutions, paraformaldehyde (paraform) or gaseous formaldehyde.

The following examples are presented to further illustrate the invention without limiting its scope.

EXAMPLES 1–15

This series of examples illustrates the influence of some salts on the formation rate (productivity) of trioxane.

The apparatus illustrated in FIG. 1 was employed. The reactor 1, the feeder 8 and the sampling device 3, 5 were kept at a constant temperature of 100° C. Through the pipe system 9 a nitrogen head was maintained at a constant pressure of about 5 cm. Hg.

A 65% (g./100 cc.) formaldehyde solution containing from 10 to 15 g./100 cc. of dissolved salts was introduced into reactor 1; and an aqueous solution of 50% by vol. sulfuric acid was added to the feeder 8. Then the apparatus and the reactants were brought to 100° C., the acid quickly introduced into the solution and the run thus begun. After 15 minutes, a sample of the reaction mixture was taken, the trioxane concentration determined and the formation rate calculated for this time interval. The resuls are reported in Table 1, together with the concentration of the components (sulfuric acid, salt, formaldehyde) (in grams per 100 cc. of solution). The productivity (g./h./l.) indicates the grams of trioxane formed within one hour in one liter of solution.

TABLE 1

| Example No. | Catalyst Acid Type | Acid Conc. (percent) | Salt Type | Salt Conc. (percent) | $CH_2O$ conc. (percent) | Productivity (g./h./l.) |
|---|---|---|---|---|---|---|
| 1 | $H_2SO_4$ | 2 | LiCl | 10 | 60 | 102 |
| 2 | $H_2SO_4$ | 2 | $NiCl_2$ | 10 | 60 | 97 |
| 3 | $H_2SO_4$ | 2 | $FeCl_2$ | 10 | 60 | 101 |
| 4 | $H_2SO_4$ | 2 | $ZnCl_2$ | 10 | 60 | 84 |
| 5 | $H_2SO_4$ | 2 | KCl | 10 | 60 | 83 |
| 6 | $H_2SO_4$ | 2 | $MnCl_2$ | 10 | 60 | 91 |
| 7 | $H_2SO_4$ | 2 | $CdCl_2$ | 10 | 60 | 86.5 |
| 8 | $H_2SO_4$ | 2 | NaCl | 10 | 60 | 82 |
| 9 | $H_2SO_4$ | 2 | $AlCl_3$ | 10 | 60 | 90 |
| 10 | $H_2SO_4$ | 2 | | | 60 | 54 |
| 11 | $H_2SO_4$ | 2 | LiCl | 12.9 | 50 | 62 |
| 12 | $H_2SO_4$ | 2 | $MgCl_2$ | 14.2 | 50 | 64 |
| 13 | $H_2SO_4$ | 2 | | | 50 | 28 |
| 14 | $H_2SO_4$ | 2 | Li-methionate | 10 | 60 | 85 |
| 15 | $H_2SO_4$ | 2 | Na-p-toluene sulfonate | 15 | 60 | 100 |

EXAMPLES 16–21

The following examples demonstrate that the addition of the salts in accordance with the present invention permits the use of lower reflux ratios and increases the productivity without reducing the trioxane yields.

The apparatus illustrated in FIG. 2, which allows the continuous preparation of trioxane, was employed.

The run of each example was continued at atmospheric pressure at the boiling temperature (100–103° C.) for about 100 hours, by maintaining the formaldehyde concentration in the reactor at about 60 g./100 cc. The volume of the reacting solution was of 1200–1300 cc. The reflux ratio was adjusted so as to take off at the head a fraction having a constant composition, corresponding to about the azeotropic trioxane/water/formaldehyde mixture. The feeding rate of the formaldehyde solution (containng 75 g. $CH_2O/100$ cc. of solution) to the reactor was proportioned so that 75% of the formaldehyde was converted. The results are reported in Table 2, wherein the yield of trioxane refers to the percent of formaldehyde converted.

TABLE 2

| Example No. | Catalyst Acid Type | Acid Conc. (percent) | Salt Type | Salt Conc. (percent) | Productivity (g./h./l.) | Reflux ratio | Yield of trioxane (percent) |
|---|---|---|---|---|---|---|---|
| 16 | H₂SO₄ | 2 | NiCl₂ | 15 | 150 | 3.3:1 | 97.5 |
| 17 | H₂SO₄ | 2 | LiCl | 9 | 138 | 3.5:1 | 97.1 |
| 18 | H₂SO₄ | 2 | Li-methionate | 15 | 133 | 3.7:1 | 97.8 |
| 19 | H₂SO₄ | 2 | Na-p-toluene sulfonate | 15 | 105 | 6:1 | 97.5 |
| 20 | H₂SO₄ | 2 |  |  | 51 | 11:1 | 97 |
| 21 | H₂SO₄ | 12 |  |  | 145 | 3:1 | 90 |

EXAMPLE 22

A 60 g./100 cc. aqueous formaldehyde solution containing 10 g./100 cc. of p-toluenesulfonic acid and 10 g./100 cc. of the sodium salt of p-toluene sulfonic acid was introduced into the flask of FIG. 2. The solution was heated to the boiling temperature, and a reflux ratio of 3.4:1 was maintained. The distillate contained 51.5% by weight of trioxane, 14.1% of formaldehyde, the remainder being water. A solution of formaldehyde (containing 75 g. of CH₂O in 100 cc. solution) was fed from the feeder 12 to the reaction flask at such a rate (350 cc./h.) as to maintain the volume of the solution in the flask, as well as the concentration of the formaldehyde (60 g./100 cc.) constant. The run was continued for 91 hours. 24.974 kg. of 100% formaldehyde were fed; 18.648 kg. of trioxane and 5.932 kg. of unconverted formaldehyde were recovered. The conversion of CH₂O was 76.3%, the yield of trioxane based on the converted CH₂O was 98%, the productivity was 157 g./h./l.

EXAMPLE 23

Using the same procedure and apparatus as in Examples 16–21, two runs were carried out, the first (a) with 5 g./100 cc. of sulfuric acid and 5 g./100 cc. of the sodium salt of p-toluenesulfonic acid, the second (b) with 5 g./100 cc. of sulfuric acid only. The results obtained were, respectively:

|  | (a) | (b) |
|---|---|---|
| Productivity (g./h./l.) | 145 | 101 |
| Reflux ratio | 2.7 | 4.5 |
| Yield of trioxane (percent) | 97.8 | 97.5 |

Variations can, of course, be made without departing from the spirit and scope of the invention.

Having thus described our invention, what we desire to secure by Letters Patent and hereby claim is:

1. In a process for the preparation of 1,3,5-trioxane by contacting a concentrated aqueous formaldehyde solution, containing from 50 to 70 g. of CH₂O per 100 cc. of solution, with a strong acid in an amount corresponding to 0.1–8% by weight of sulfuric acid, the improvement consisting of adding to said solution between about 5 and 15 grams per 100 cc. of said solution of a soluble salt of aluminum or a soluble salt of a monovalent or bivalent metal selected from the group consisting of Li, Na, K, Rb, Mg, Ca, Sr, Ba, Zn, Cd, Hg, Mn, Fe, Co and Ni, said salt being the salt of an inorganic or organic acid having a pKa lower than 2, said process being carried out at a temperature between about 95 and 105° C., under approximately atmospheric pressure.

2. The process of claim 1 wherein said solution is contacted with sulfuric acid in an amount between about 2 and 6 g. per 100 cc. of said solution or with p-toluenesulfonic acid in an amount between about 5 and 15 g. per 100 cc. of said solution.

3. The process of claim 2 carried out under atmospheric pressure under reflux.

4. The process of claim 1 wherein said salt is an alkaline metal chloride.

References Cited

UNITED STATES PATENTS

| 3,347,869 | 10/1967 | Flodin et al. | 260—340 |
| 3,149,127 | 9/1964 | Platz | 260—340 |
| 893,784 | 7/1908 | Chute | 203—33 X |
| 2,286,503 | 6/1942 | Ocon | 203—50 X |

FOREIGN PATENTS

| 1,307,851 | 9/1962 | France | 260—340 |

OTHER REFERENCES

Houben-Weyl, Methoden der Organischen Chemie, vol. I/1 (1958) pp. 886–869.

NORMAN S. MILESTONE, Primary Examiner

U.S. Cl. X.R.

203—62, 96, Dig. 2, Dig. 6

PO-1050
(5/69)

UNITED STATES PATENT OFFICE
CERTIFICATE OF CORRECTION

Patent No. 3,661,932                           Dated May 9, 1972

Inventor(s) GIANFRANCO PREGAGLIA, MARCO AGAMENNONE & LUIGI CAVALLI

It is certified that error appears in the above-identified patent and that said Letters Patent are hereby corrected as shown below:

Column 3, line 28: "granudally" should read -- gradually --;
line 63: "wegiht" should read -- weight --. Column 4, line
26: "resuls" should read -- results --.

Signed and sealed this 12th day of September 1972.

(SEAL)
Attest:

EDWARD M. FLETCHER, JR.                    ROBERT GOTTSCHALK
Attesting Officer                          Commissioner of Patents